US012589981B2

(12) United States Patent
Smith et al.

(10) Patent No.: US 12,589,981 B2
(45) Date of Patent: Mar. 31, 2026

(54) DEVICES FOR CAPPING VIALS USEFUL IN SYSTEM AND METHOD FOR DISPENSING PRESCRIPTIONS

(71) Applicant: PARATA SYSTEMS, LLC, Durham, NC (US)

(72) Inventors: Jake R. Smith, Durham, NC (US); Mark Goodman, Durham, NC (US); Michael Lee McCord, Durham, NC (US); Sam Beeler, Durham, NC (US); Andrew Scott Mandeville, Durham, NC (US)

(73) Assignee: PARATA SYSTEMS, LLC, Durham, NC (US)

( * ) Notice: Subject to any disclaimer, the term of this patent is extended or adjusted under 35 U.S.C. 154(b) by 0 days.

(21) Appl. No.: 18/830,904

(22) Filed: Sep. 11, 2024

(65) Prior Publication Data

US 2026/0070772 A1 Mar. 12, 2026

(51) Int. Cl.
*B67B 3/00* (2006.01)
*B67B 3/20* (2006.01)
(Continued)

(52) U.S. Cl.
CPC .......... *B67B 3/2053* (2013.01); *B67B 3/2066* (2013.01); *B67B 3/28* (2013.01); *B65B 7/2835* (2013.01)

(58) Field of Classification Search
CPC ....... B65B 7/2835; B65B 7/2807; B65B 1/24; B65B 3/12; B65B 43/54; B65B 69/005;
(Continued)

(56) References Cited

U.S. PATENT DOCUMENTS 2,496,877 A * 2/1950 Krueger ................ B65B 7/2835 53/88
3,835,619 A 9/1974 Reisman
(Continued)

FOREIGN PATENT DOCUMENTS

CN 100590060 C 2/2010
CN 118373368 A 7/2024

OTHER PUBLICATIONS

International Search Report and Written Opinion corresponding to PCT/US2025/041578; Mailed: Nov. 17, 2025, (14 pp).

*Primary Examiner* — Jacob A Smith
(74) *Attorney, Agent, or Firm* — Myers Bigel, P.A.

(57) ABSTRACT

An apparatus for securing a cap on a cylindrical container includes: a stage for separately receiving a cap and a container; an elevator movable upwardly away from the stage and downwardly toward the stage; and a cap holding assembly mounted on the elevator. The cap holding assembly comprises: a capture member platform, the capture member platform including a capture unit configured to capture the cap; at least one extendable member extending through the capture member platform, the at least one extendable member movable from a home position with the extendable member above a center of the cap captured by the capture unit and an engagement position with the extendable member engaging the center of the cap and urging the center of the cap downwardly relative to an outer sidewall of the cap; and a claw member attached to the capture member platform that is movable between an unengaged position, in which the claw member is not positioned to engage the cap, and an engaged position, in which the claw member is positioned to engage a lower edge of the cap.

10 Claims, 14 Drawing Sheets

(51) Int. Cl.
*B67B 3/28* (2006.01)
*B65B 7/28* (2006.01)

(58) Field of Classification Search
CPC .. B65B 69/0058; B65B 7/2821; B65B 7/2828
USPC ......... 53/367, 490, 334, 484, 485, 317, 310, 53/306
See application file for complete search history.

(56) References Cited

U.S. PATENT DOCUMENTS

| | | | | |
|---|---|---|---|---|
| 5,337,919 | A | 8/1994 | Spaulding et al. | |
| 6,006,946 | A | 12/1999 | Williams et al. | |
| 6,036,812 | A | 3/2000 | Williams et al. | |
| 6,176,392 | B1 | 1/2001 | William et al. | |
| 6,418,701 | B1 | 7/2002 | Navarro | |
| 6,971,541 | B2 | 12/2005 | Williams et al. | |
| 7,387,049 | B1 | 6/2008 | Ver et al. | |
| 7,581,373 | B2 | 9/2009 | Sink et al. | |
| 7,596,932 | B2 | 10/2009 | Sink et al. | |
| 7,721,510 | B2 | 5/2010 | Yuyama et al. | |
| 7,770,358 | B2 | 8/2010 | Sink et al. | |
| 8,016,095 | B2 | 9/2011 | Daniels et al. | |
| 8,261,936 | B2 | 9/2012 | Dumond et al. | |
| 8,413,410 | B2 | 4/2013 | Ulm et al. | |
| 8,869,861 | B2 | 10/2014 | Bouchelle et al. | |
| 11,024,407 | B2 | 6/2021 | Rhoads et al. | |
| 11,905,061 | B2 | 2/2024 | Curl et al. | |
| 12,043,432 | B2 | 7/2024 | Jehn et al. | |
| 2008/0110555 | A1 | 5/2008 | Bouchelle et al. | |
| 2008/0283179 | A1 | 11/2008 | Sink | |
| 2011/0233840 | A1* | 9/2011 | Sink | G07F 11/70 475/269 |
| 2015/0175398 | A1* | 6/2015 | Christensen | B67B 7/182 53/318 |
| 2020/0002031 | A1 | 1/2020 | Hiramoto et al. | |
| 2020/0255171 | A1 | 8/2020 | Pedrazzi et al. | |
| 2023/0249956 | A1* | 8/2023 | Numata | B67B 3/2073 53/317 |

* cited by examiner

DEVICES FOR CAPPING VIALS USEFUL IN SYSTEM AND METHOD FOR DISPENSING PRESCRIPTIONS

FIELD OF THE INVENTION

The present invention is directed generally to the dispensing of prescriptions for pharmaceuticals, and more specifically is directed to the automated dispensing of pharmaceuticals.

BACKGROUND

Pharmacy generally began with the compounding of medicines which entailed the actual mixing and preparing of medications. Heretofore, pharmacy has been, to a great extent, a profession of dispensing, i.e., the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a closure (i.e., a lid) on the container after it is filled.

Another automated system for dispensing pharmaceuticals is described in some detail in U.S. Pat. No. 6,971,541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval. The capping operation of the Williams system is described in detail in U.S. Pat. No. 7,596,932 to Sink et al. and U.S. Pat. No. 8,413,410 to Ulm et al.

One advancement in pharmaceutical vials is the development of child-proof caps, which can prevent children from inadvertently having access to medications. A number of child-proof cap designs have been developed. One such design is shown in FIGS. 1-3, in which a prescription vial V and a cap C are illustrated. The cap C includes a center portion 402 and an outer sidewall portion or circumferential edge 404. The cap C is configured to be manipulated between a child-resistant orientation or state (FIG. 2) and a non-child-resistant orientation or state (FIG. 3). Specifically, the center portion 402 may be pressed downward relative to the outer portion 404 (as indicated by the arrows in FIG. 3) to place the cap C in the non-child-resistant orientation. There may be audible and/or tactile feedback such as a "snap" or "click" when the cap C is successfully manipulated from the child-resistant orientation to the non-child-resistant orientation. An example of this type of vial and cap is the ProMaxx® series available from Altium Healthcare.

Certain customers may want their prescriptions to be provided in a vial with the cap in the non-child-resistant configuration. This may be because the environment in which the medications are taken have no children present and/or are dispensed by medical professionals (e.g., nurses). Moreover, some elderly and/or infirm patients may have difficulty in manipulating the center portion 402 of the cap C to the non-child-proof state.

U.S. Pat. No. 11,905,061 to Curl et al. describes a variation of the capping system discussed in Sink et al. and Ulm et al. that can provide a capped vial with the cap in the non-child-proof configuration. In essence, the capping elevator includes some means for resisting rotation of the cap (e.g., blades with sharp edges or a "socket"-type member) and a piston-style member that is positioned to contact the center portion 402 of the cap C. Once the cap is centered on a stage prior to capping, the elevator lowers and pushes on the center portion 402 of the cap C to convert the cap C to the non-child-proof configuration. The elevator then lifts the cap from the stage. A robotic arm conveys a filled vial to the stage, the elevator lowers with the cap to position the cap atop the vial, and the stage rotates the vial (as the cap remains stationary) to twist the cap onto the vial. The filled, capped vial is then picked up by the robotic arm and conveyed to an offloading station.

While this system operates successfully with many caps, in some instances performance could be improved. As such, it may be desirable to provide another technique for capping filled vials and offloading them in a non-child-proof configuration.

SUMMARY

As a first aspect, embodiments of the invention are directed to an apparatus for securing a cap on a container. The apparatus comprises: a stage for separately receiving a cap and a container; an elevator movable upwardly away from the stage and downwardly toward the stage; and a cap holding assembly mounted on the elevator. The cap holding assembly comprises: a capture member platform, the capture member platform including a capture unit configured to capture the cap; at least one extendable member extending through the capture member platform, the at least one extendable member movable from a home position with the extendable member above a center of the cap captured by the capture unit and an engagement position with the extendable member engaging the center of the cap and urging the center of the cap downwardly relative to an outer sidewall of the cap; and a claw member attached to the capture member platform that is movable between an unengaged position, in which the claw member is not positioned to engage the cap, and an engaged position, in which the claw member is positioned to engage a lower edge of the cap.

As a second aspect, embodiments of the invention are directed to a method comprising:

(a) positioning a cap on a stage, the cap comprising a center portion and an outer sidewall portion, the center portion configured to be pressed downward relative to the outer sidewall to place the cap in a non-child-resistant configuration;

(b) translating a cap holding assembly downwardly toward the stage, the cap holding assembly comprising a capture member platform and at least one extendable member movable from a home position to an engagement position wherein the extendable member is closer to the stage in the engagement position than in the home position;

(c) lifting the cap from the stage with the cap holding assembly;

(d) positioning a vial filled with medicaments on the stage;

(c) lowering the cap holding assembly so that the cap engages the vial;

(f) rotating the vial relative to the cap to attach the cap onto the vial; and then (g) urging the center portion of the cap downward relative to the outer sidewall of the cap to place the cap in the non-child-resistant orientation by actuating the at least one extendable member from the home position to the engagement position.

DETAILED DESCRIPTION

Figure 1:
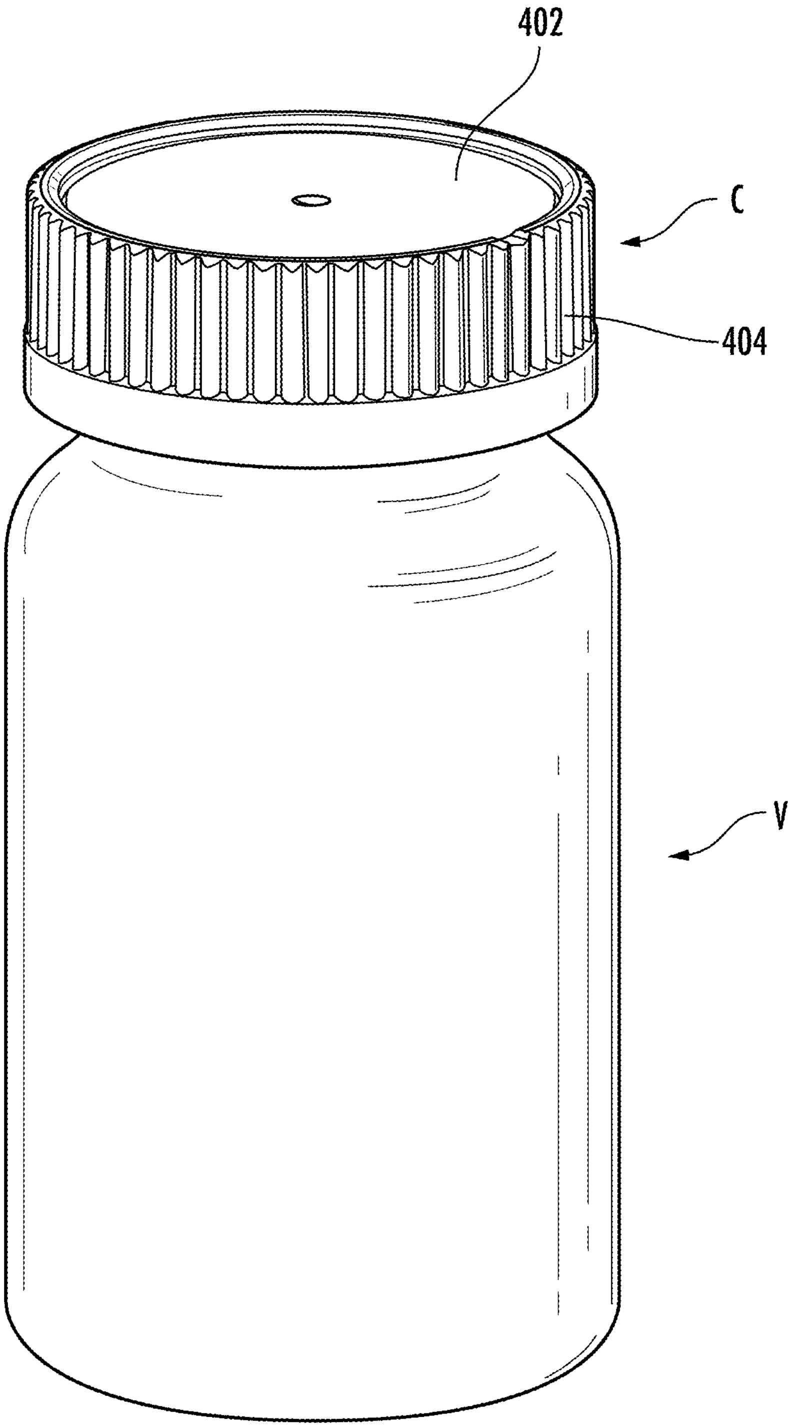
FIG. 1 is a top perspective view of a vial and cap with the cap configured to be in a child-resistant orientation.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for case of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Also, as used herein, the terms "cap" and "closure" are used interchangeably to refer to a component that caps or closes a pharmaceutical vial.

Well-known functions or constructions may not be described in detail for brevity and/or clarity.

Figure 4:
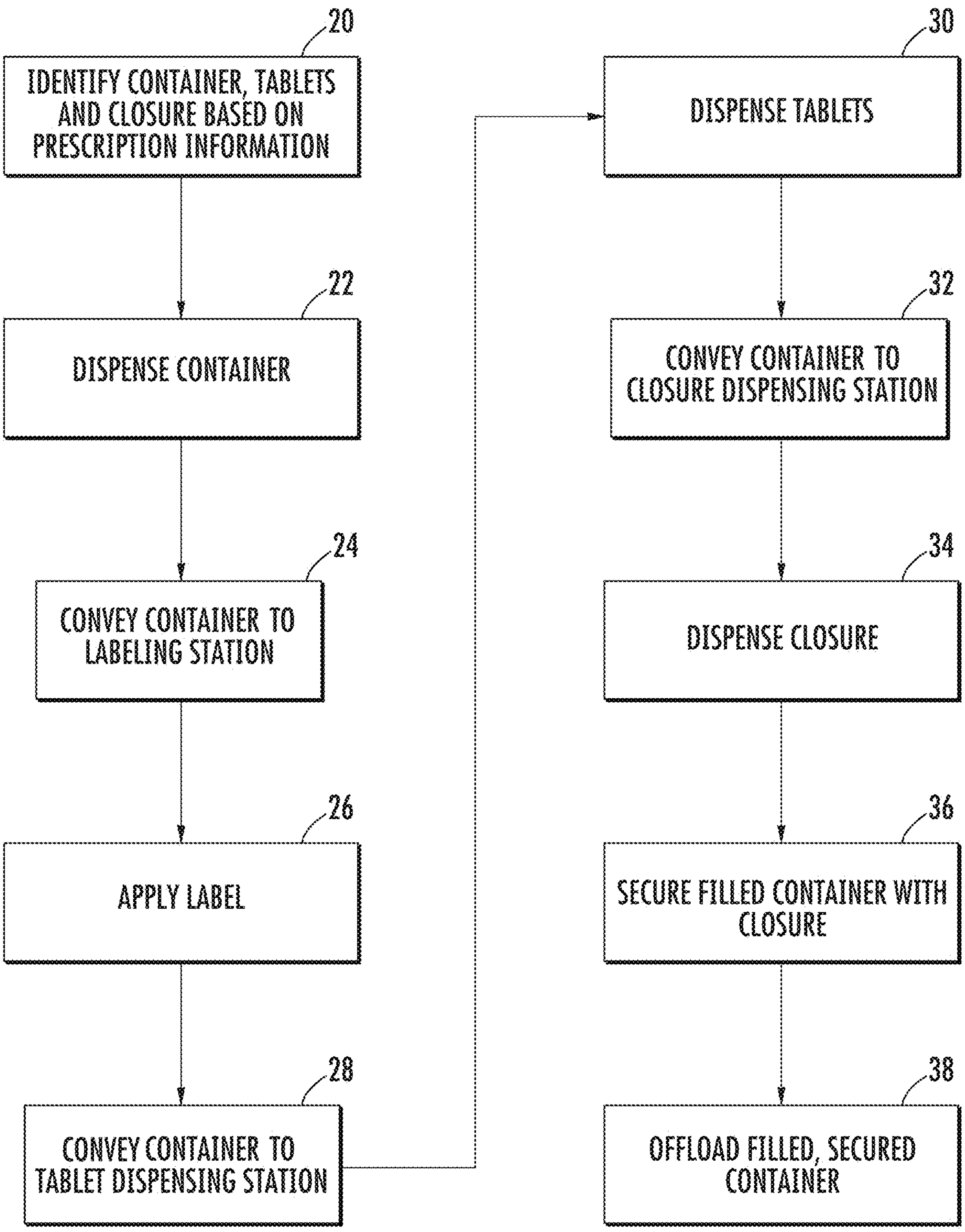
FIG. 4 is a flow chart illustrating an embodiment of a method according to the present invention.

As described above, the invention relates generally to a system and process for dispensing pharmaceuticals. An exemplary process is described generally with reference to FIG. 4. The process begins with the identification of the proper container, tablets or capsules and closure to be dispensed based on a patient's prescription information (Box 20). A container of the proper size is dispensed at a container dispensing station (Box 22), then moved to a labeling station (Box 24). The labeling station applies a label (Box 26), after which the container is transferred to a tablet dispensing station (Box 28), from which the designated tablets are dispensed in the designated amount into the container (Box 30). The filled container is then moved to a closure dispensing station (Box 32), where a closure of the proper size has been dispensed (Box 34). The filled container is secured with a closure (Box 36), then transported to an offload station and offloaded (Box 38).

Figure 5:
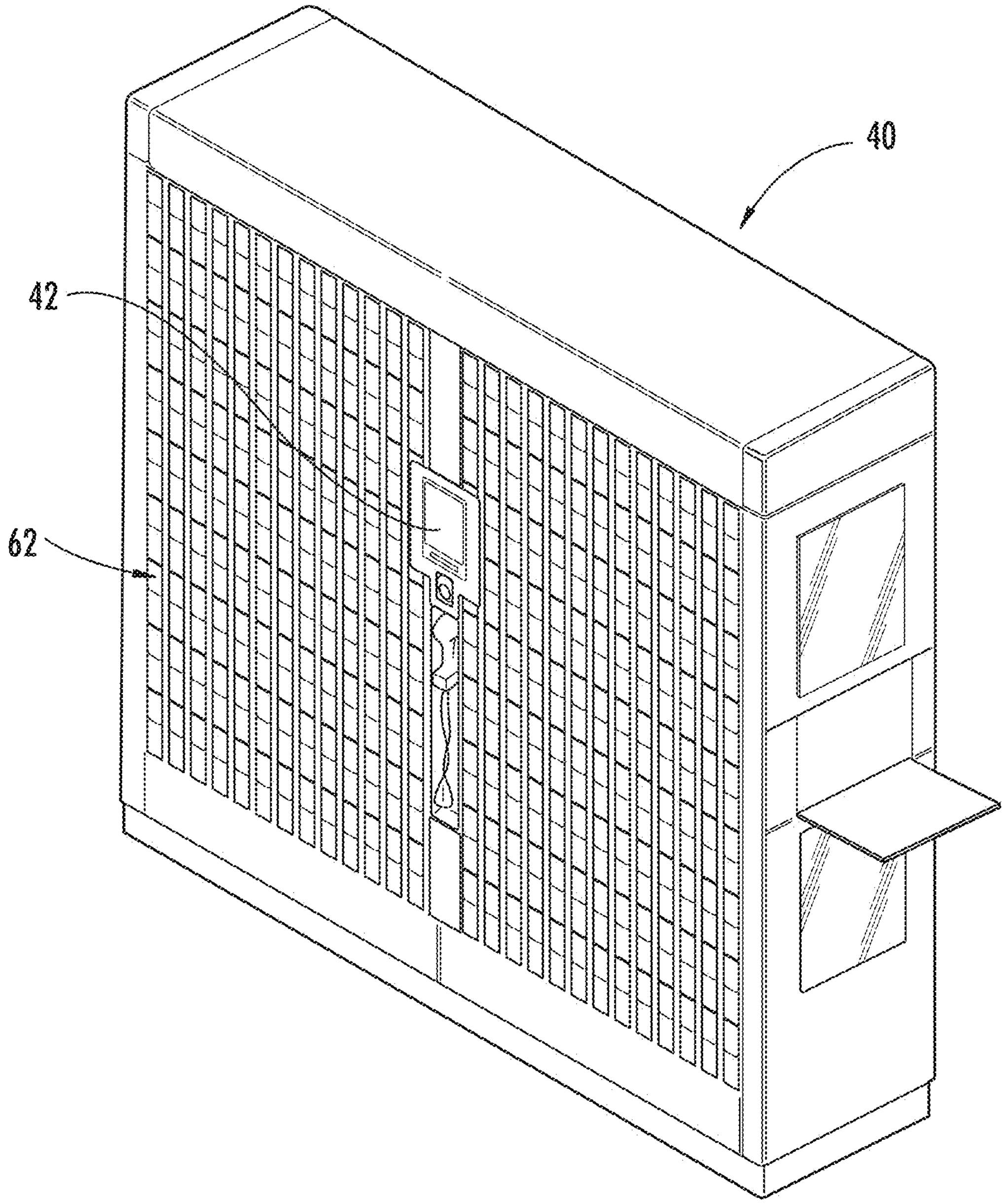
FIG. 5 is a perspective view of a pharmaceutical tablet dispensing system according to the present invention.
Figure 6:
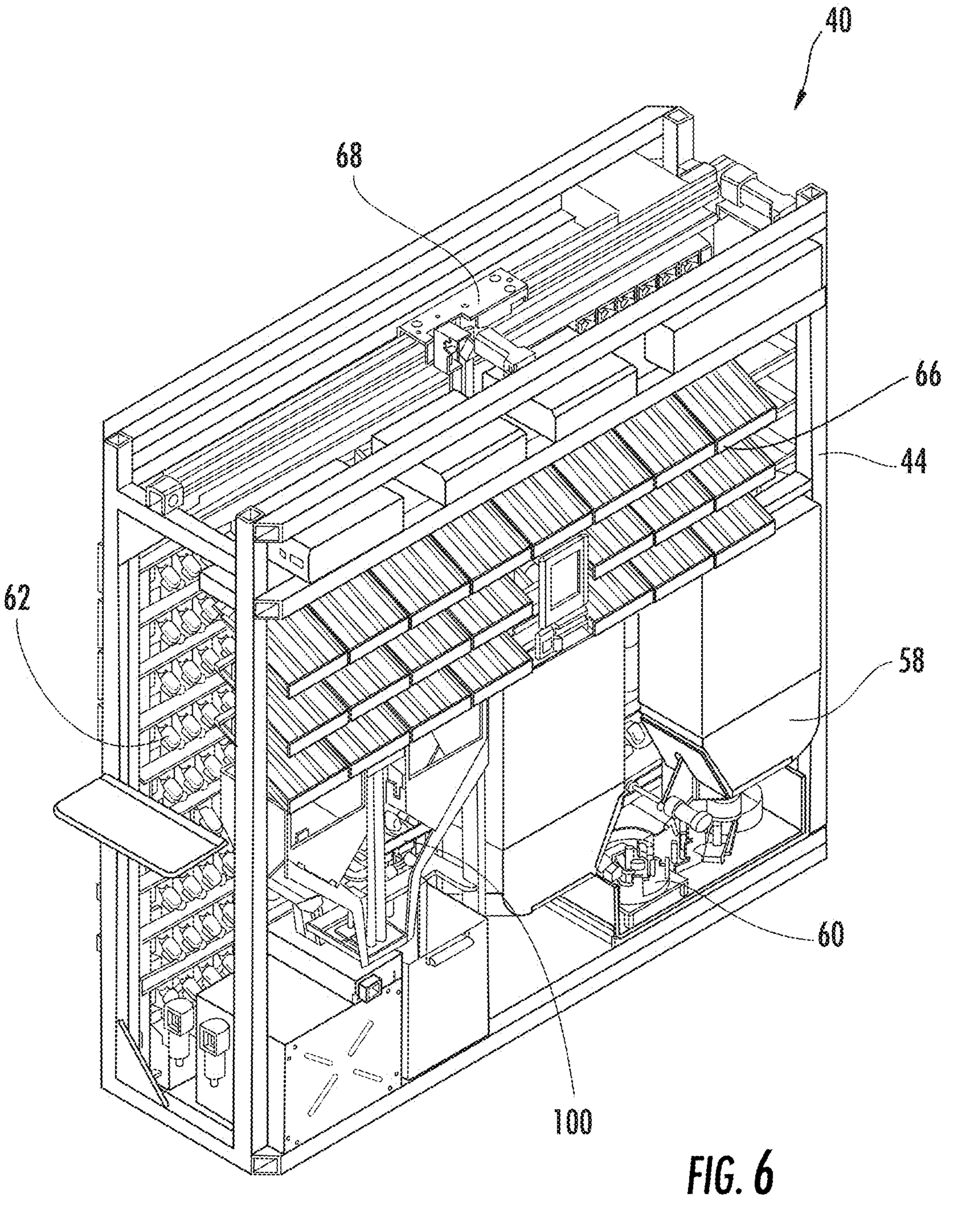
FIG. 6 is a cutaway reverse perspective view of the system of FIG. 4 illustrating the support frame, the container dispensing station, the carrier, and the closure dispensing station.

A system that can carry out this process is illustrated in FIGS. 5 and 6 and designated broadly therein at 40. The system 40 includes a support frame 44 for the mounting of its various components. The system 40 generally includes as operative stations a controller (represented herein by a graphics user interface monitor 42), a container dispensing station 58, a labeling station 60, a tablet dispensing station 62, a closure station 100, and an offloading station 66. In the illustrated embodiment, containers, tablets and closures are moved between these stations with a single carrier 68; however, in some embodiments additional carriers may be employed. With the exception of the closure station 100, which is described in detail below, each of the other operative stations and the conveying devices is described in detail in U.S. Pat. No. 6,971,541 to Williams et al.; U.S. Pat. No. 8,261,936 to Dumond et al.; U.S. Pat. No. 8,016,095 to Daniels et al., and U.S. Pat. No. 8,869,861 to Bouchelle et al.; and U.S. Patent Application Publication No. 2008/0283179 to Sink, the disclosure of each of which is hereby incorporated herein in full.

Figure 7:
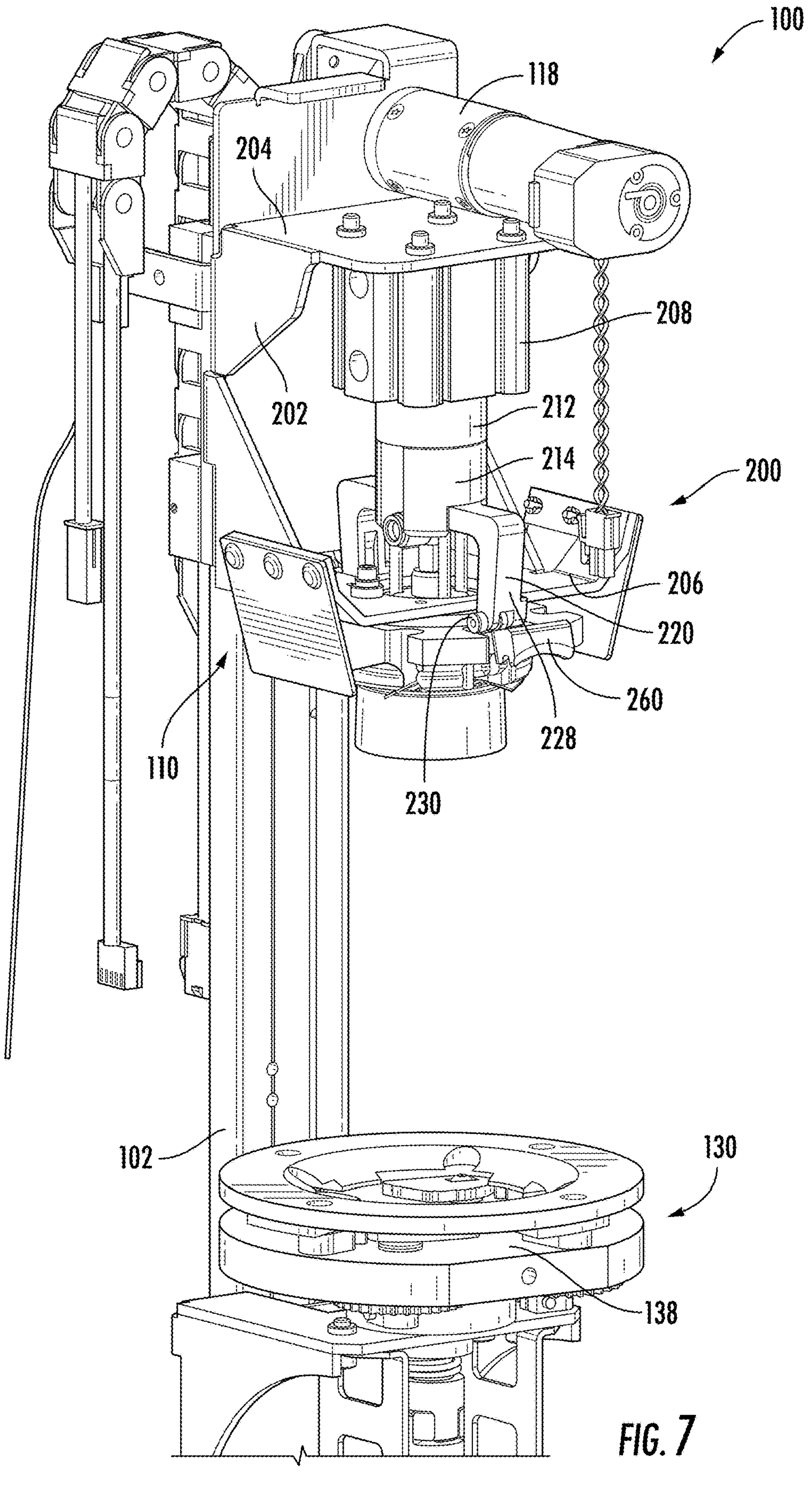
FIG. 7 is a perspective view of a closure station for the system of FIG. 5 shown in a raised position.

Referring now to FIG. 7, the basic structure of the closure station 100 (which is capable of carrying out the method described in FIG. 16) is illustrated therein. The closure station includes a frame 102, an elevator assembly 110 attached to the frame 102, and a centering assembly 130 that is also mounted to the frame. The elevator 110 can be raised and lowered relative to the frame 102 and the centering assembly 130 via a motor-driven pinion 118, and incudes a cap holding assembly 200 that can receive, lift, and grasp a cap. The centering assembly 130 is configured to (a) center a cap deposited on its main stage 138, which is then lifted from the main stage 138 with the cap holding assembly 200 of the elevator assembly 110, (b) center a filled vial deposited on the main stage 138, and (c) grip and rotate the vial relative to the cap holding assembly 200 as the cap holding assembly 200 holds the cap stationary in order to apply the cap to the vial. Much of the structure and function of the closure station 100 are described in considerable detail in U.S. Pat. Nos. 7,581,373, 7,596,932, 7,770,358, 8,413,410, and 11,905,061, the disclosure of each of which is hereby incorporated herein in full. As such, the general operation of the entire closure station 100 need not be described herein in detail; however, differences in the elevator assembly 110, and in particular the cap holding assembly 200, are set forth below.

Figure 8:
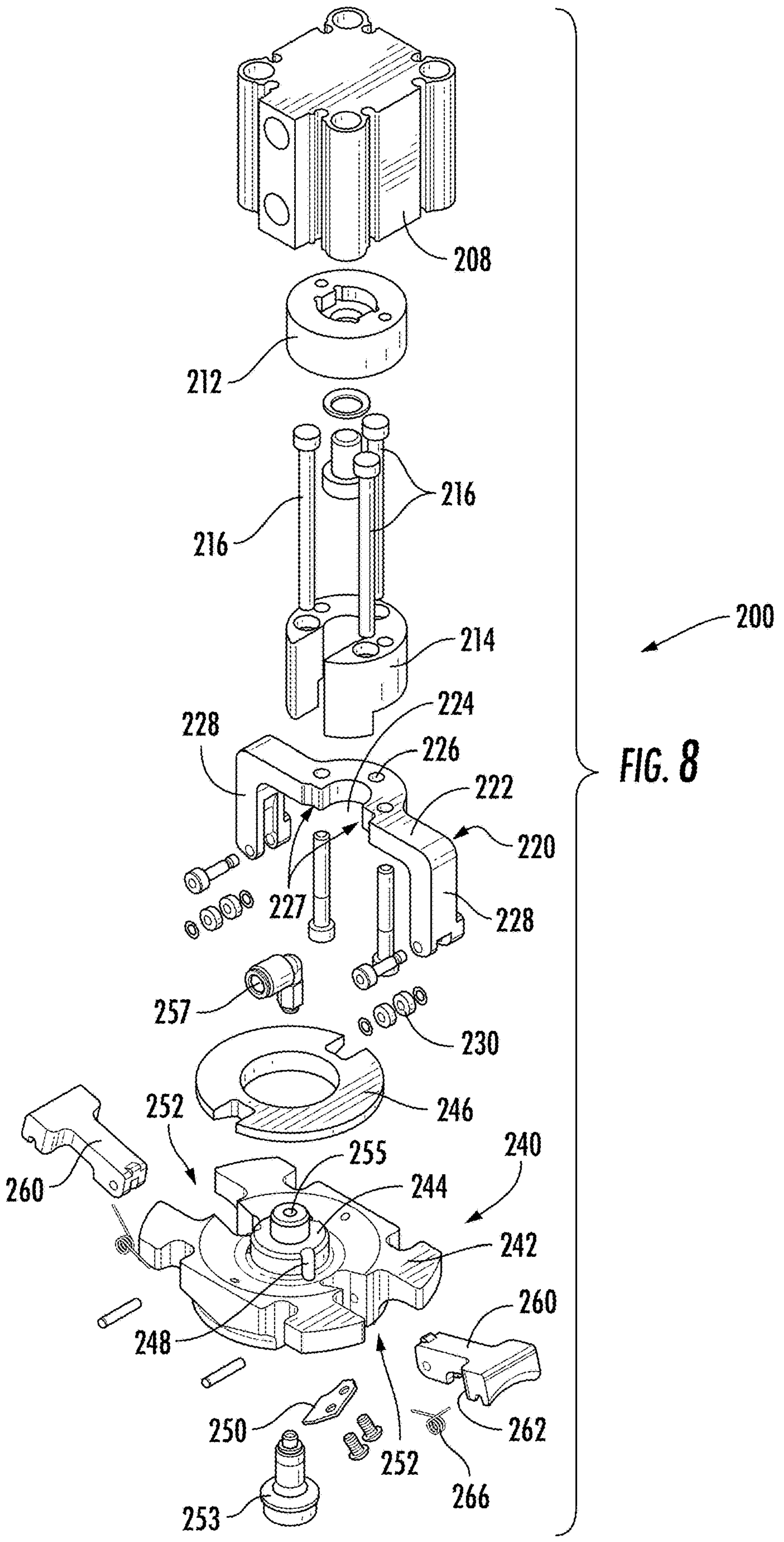
FIG. 8 is an exploded perspective view of the components of the cap holding assembly of the closure station of FIG. 7.
Figure 9:
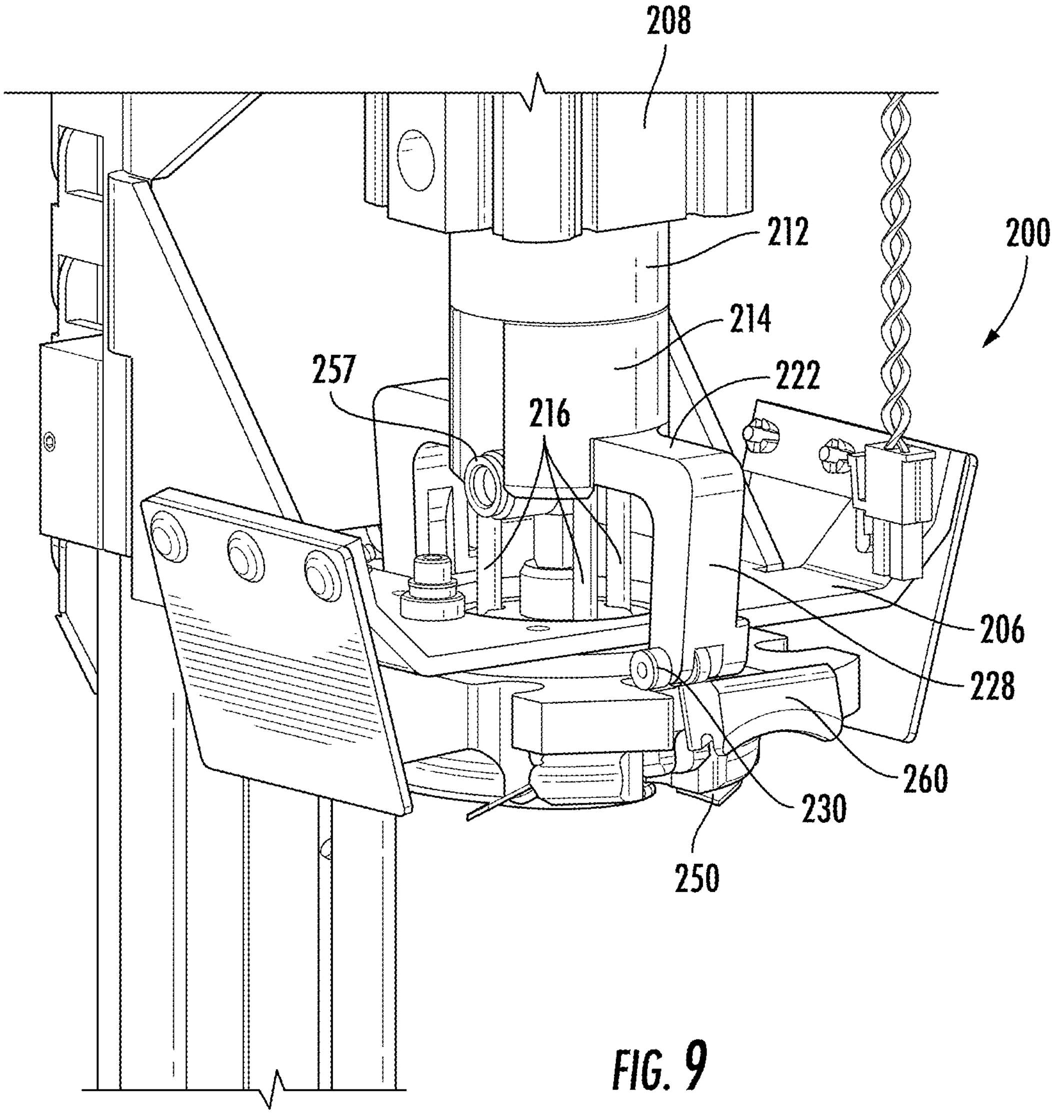
FIG. 9 is an assembled front perspective view of the cap holding assembly of FIG. 8.

With reference to FIGS. 7-9, the cap holding assembly 200 includes a generally C-shaped bracket 202 with a ceiling 204 and a floor 206. An actuator 208 is mounted to the ceiling 204. The actuator 208 includes a shaft 210 (seen in FIG. 11) that can retract within the actuator 208 and extend downwardly therefrom. An adapter 212 is mounted on the lower end of the shaft 210. A ram 214 is mounted below and configured to move with the adapter 212 and shaft 210. Three core pins 216 extend downward from the ram 214.

A U-shaped yoke 220 is fixed to the lower surface of the ram 214. The yoke 220 includes an upper main body 222 that is horizontally disposed. The main body 222 includes a semicircular recess 224, and further includes an aperture 226 and two cutouts 227 through which the core pins 216 extend. The yoke 220 also includes an arm 228 that extends downwardly from each end of the main body 222. A round bearing 230 is fixed near the lower end of each arm 228.

Figure 10:
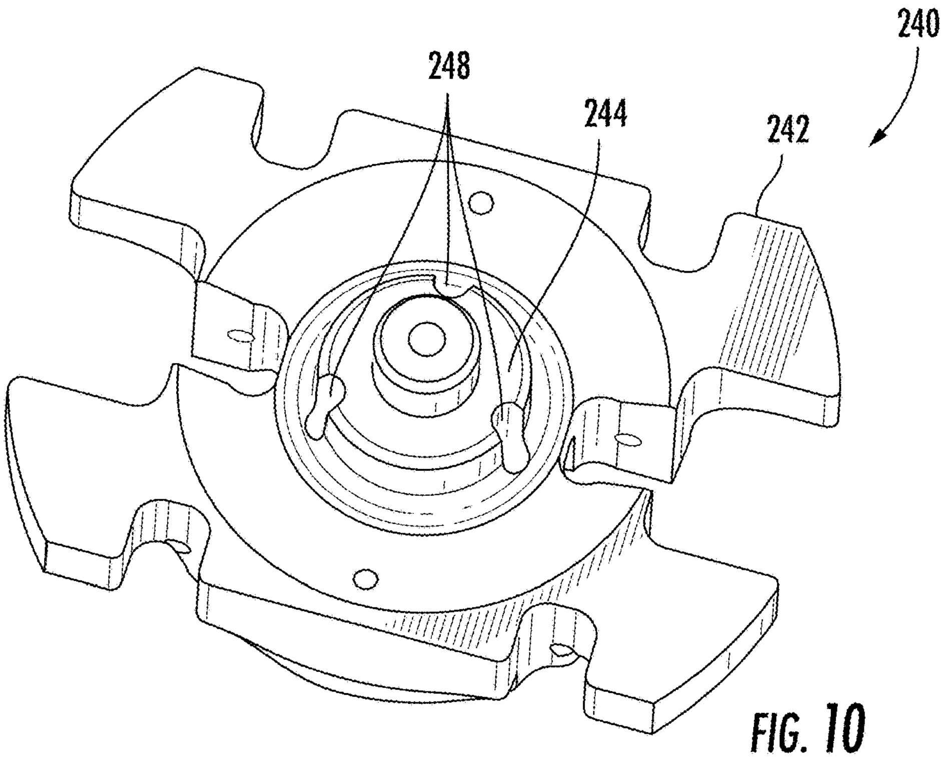
FIG. 10 is a perspective view of the capture member platform of the cap holding assembly of FIG. 8.
Figure 11:
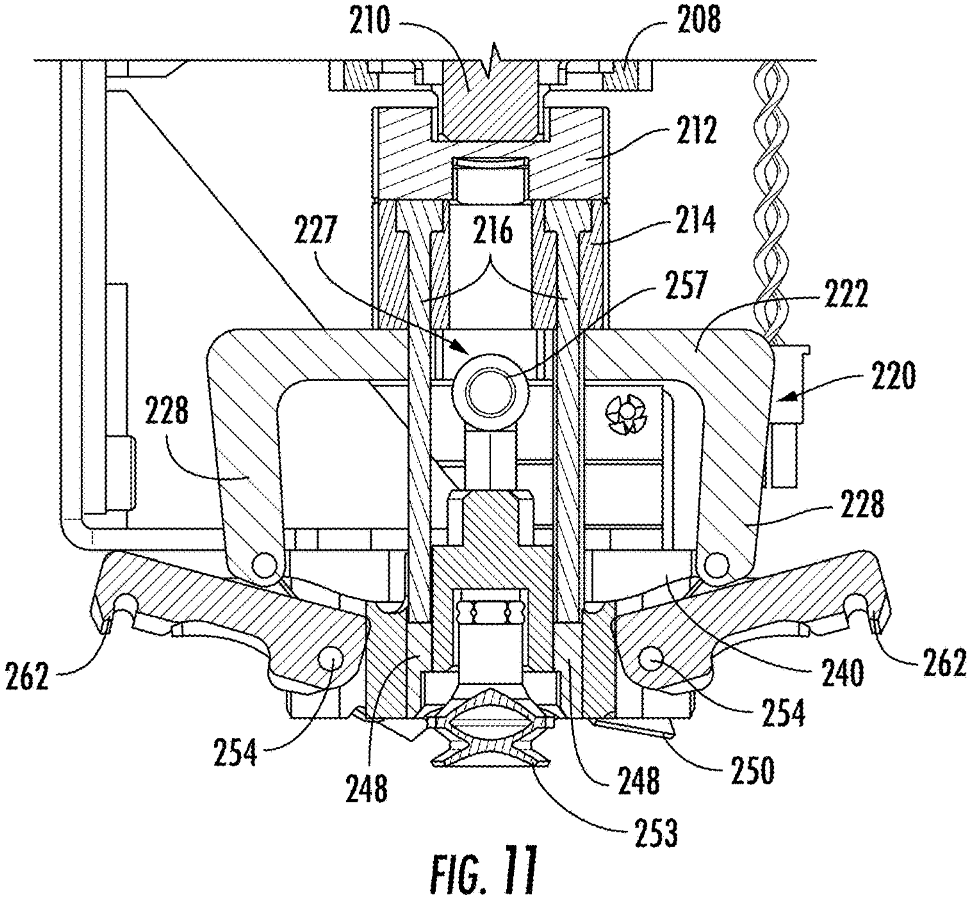
FIG. 11 is a front section view of the cap holding assembly of FIG. 9 showing the raised position of the core pins.
Figure 15:
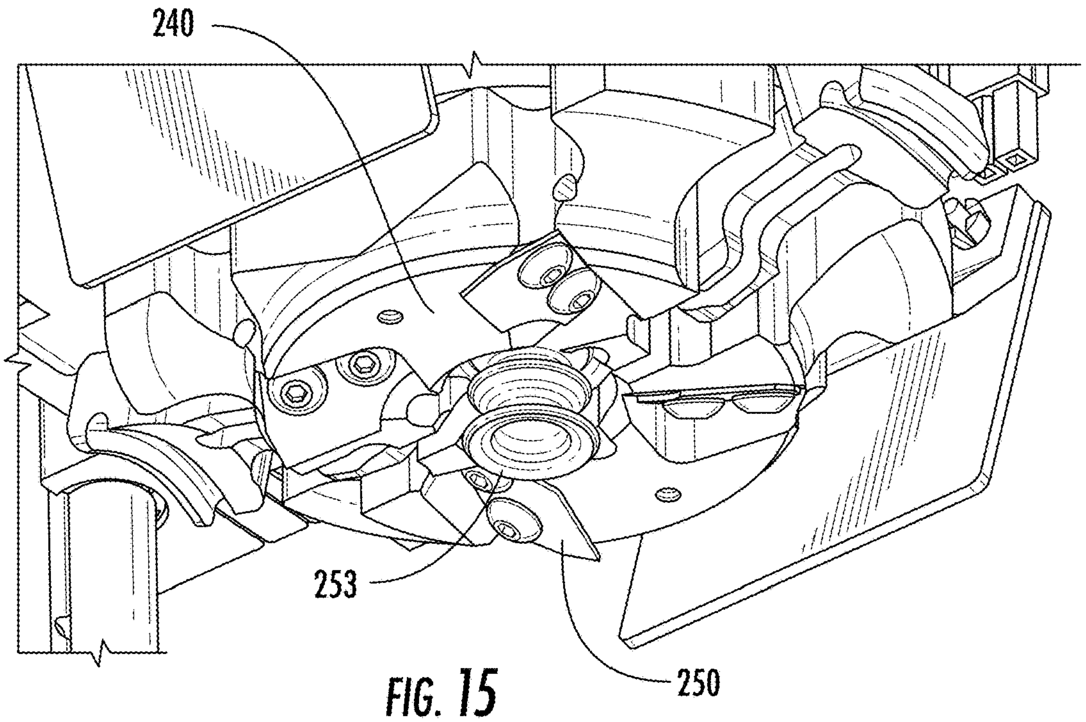
FIG. 15 is a bottom perspective view of the capture member platform of the carrier of FIG. 9 with the claw members in the extended position.

Referring now to FIGS. 7-15, and particularly to FIGS. 10 and 15, the cap holding assembly 200 further includes a capture member platform 240 that is mounted to the underside of the floor 206 of the C-shaped bracket 202. A washer 246 is interposed between the capture member platform 240 and the floor 206. The capture member platform 240 has a main body 242 with a pedestal 244 extending upwardly therefrom. Three vertical holes 248 are present at the interface between the pedestal 244 and the main body 242 to receive the core pins 216 (as seen in FIG. 11, the core pins 216 extend only into the center of the capture member platform 240). As seen in FIG. 15, four blades 250 are mounted to the underside of the main body 242 at an angle to provide sharp edges that can engage and grip a cap. A suction cup or bellows 253 is mounted to the center of the underside of the main body 242 and is fluidly connected with a bore 255 that extends through the pedestal 244 and the main body 242. A vacuum fitting 257 is fluidly attached to the bellows 253 and to a vacuum source (not shown).

Referring still to FIGS. 7-15, two claws 260 are pivotally mounted within recesses 252 of the main body 242 at pivots 254 that are defined by pivot pins. At their free ends, the claws 260 each include a finger 262. Also, a small nub 264 is present on each claw 260 on the end adjacent the pivot 254. A spring 266 (FIG. 14) is present at each pivot 254 to bias the corresponding claw 260 toward an extended position (shown in FIGS. 11 and 12), in which the claws 260 extend radially outwardly from the main body 242.

Figure 2:
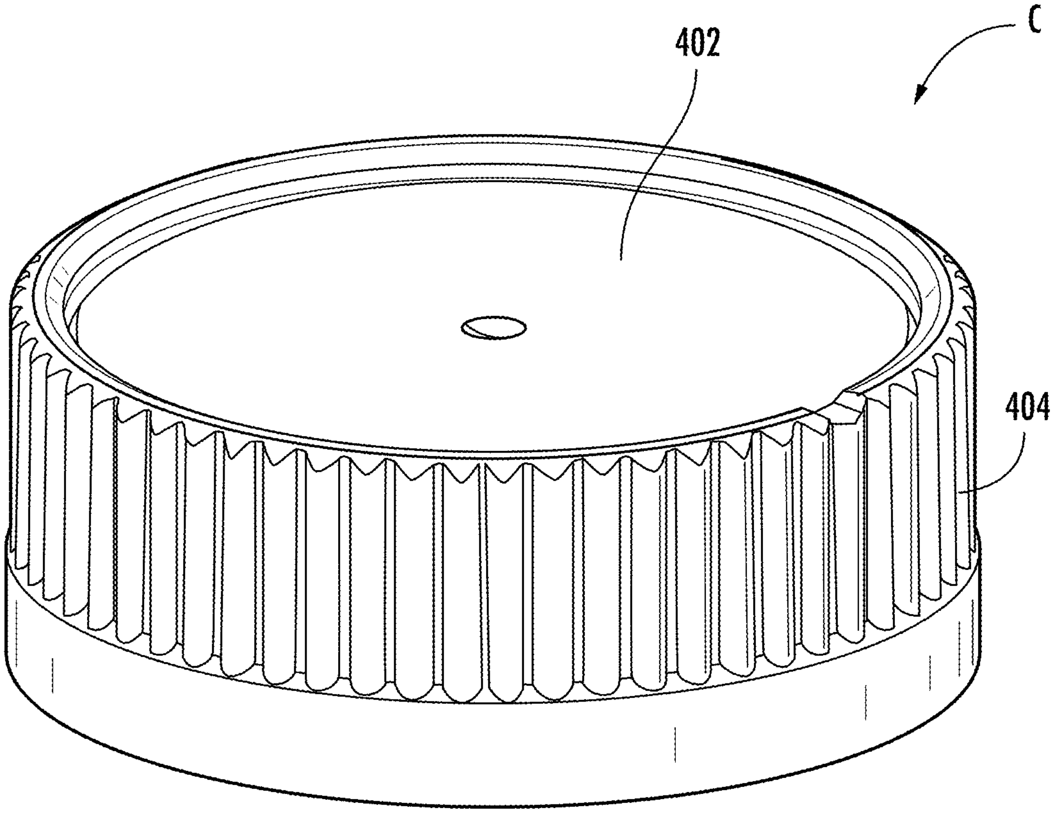
FIG. 2 is a top perspective view of the cap of FIG. 1 in the child-resistant orientation.
Figure 3:
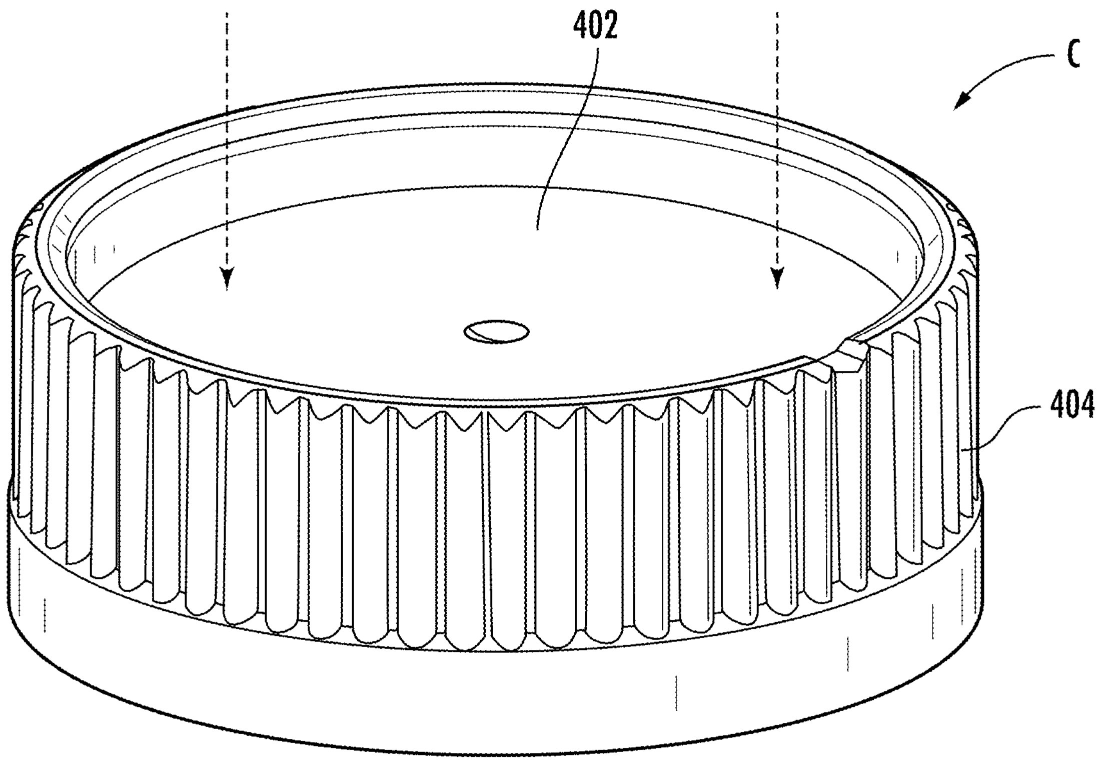
FIG. 3 is a top perspective view of the cap of FIG. 1 in the non-child-resistant orientation.
Figure 16:
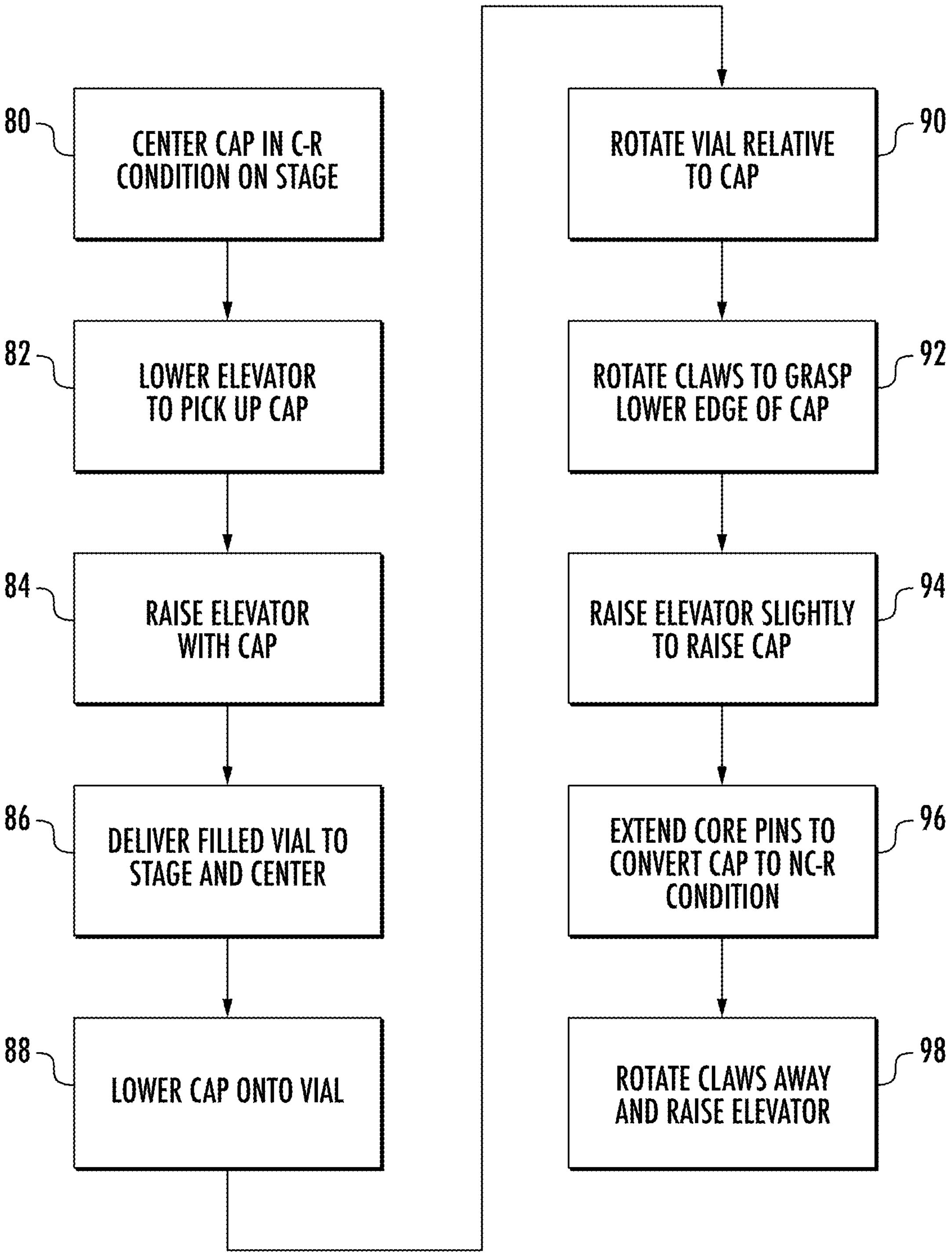
FIG. 16 is a flow chart illustrating operation of the capping station according to embodiments of the invention.

Referring now to FIG. 16, general operations of the closure station 100 are illustrated in the form of a flow chart. According to embodiments of the present invention, a cap C that is in the child-proof configuration (i.e., a state in which the center portion 402 is raised ("C-R condition"), as in FIG. 2) is centered on the main stage 138 (Block 80). The elevator 110 is lowered to pick up the cap C via the bellows 253 (Block 82), then raised from the main stage 138 (Block 84). A filled vial or other container is then delivered to and centered on the main stage 138 (Block 86). The elevator 110 lowers the cap C onto the filled vial V (Block 88), and the vial V is rotated relative to the cap C to secure the cap C to the vial V (Block 90). The claws 260 are then rotated to grasp the lower edge of the cap C (Block 92). As the claws 260 grasp the lower edge of the cap C, the elevator 110 rises slightly (Block 94), which raises the cap C slightly also. As the elevator 110 is raised in Block 94, the core pins 216 are extended; as a result, the outer portion 404 of the cap C rises as the core pins 216 maintain the center portion 402 at its elevation, thereby causing the cap C to take the non-child-proof configuration ("NC-R condition") of FIG. 3 (Block 96). The claws 260 are then rotated to their original positions, and the elevator 110 rises (Block 98) to enable the filled, capped vial V to be removed from the main stage 138.

The details of several of the steps described above are set forth in U.S. Pat. No. 11,905,061, supra, and need not be repeated herein. However, the conversion of the cap C from the child-proof to the non-child-proof state differs and is described below.

Figure 12:
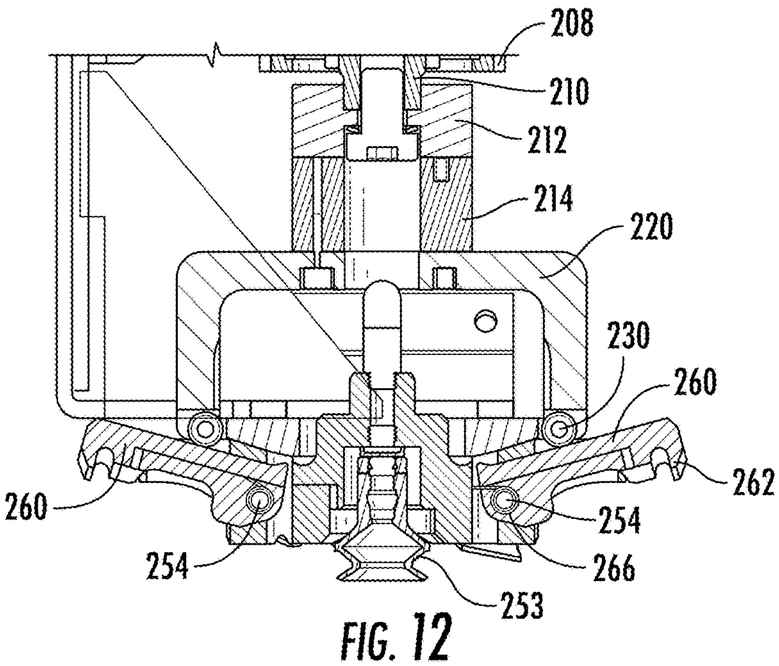
FIG. 12 is a section view of the cap holding assembly of FIG. 9 in a raised position and the claws extended.

When the elevator 110 is lowered to apply the cap C to the vial V, the ram 214 and yoke 220 are raised relative to the main body 242 of the capture member platform 240, such that the claws 260 are extended radially outwardly (see FIGS. 11 and 12). The bearings 230 of the yoke 220 bear against the upper surfaces of the claws 260. The edges of the blades 250 engage the cap C and prevent it from rotating as the centering assembly 130 rotates the vial V relative to the cap C.

Figure 13:
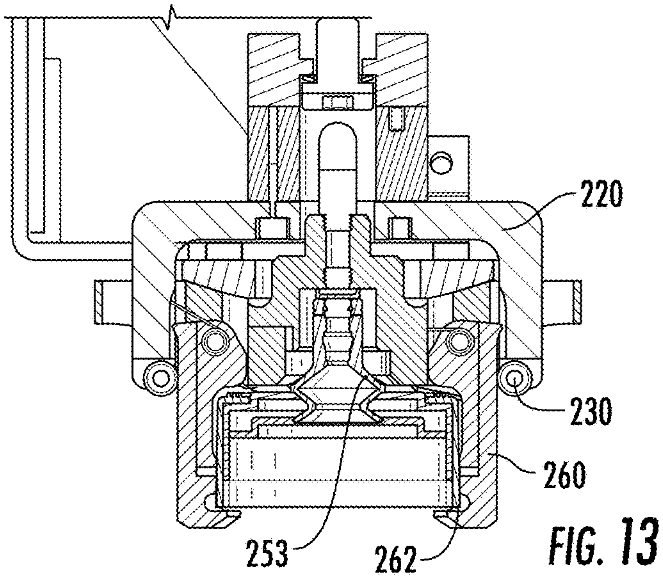
FIG. 13 is a front section view of the cap holding assembly of FIG. 9 with the claws in an engaged position.
Figure 14:
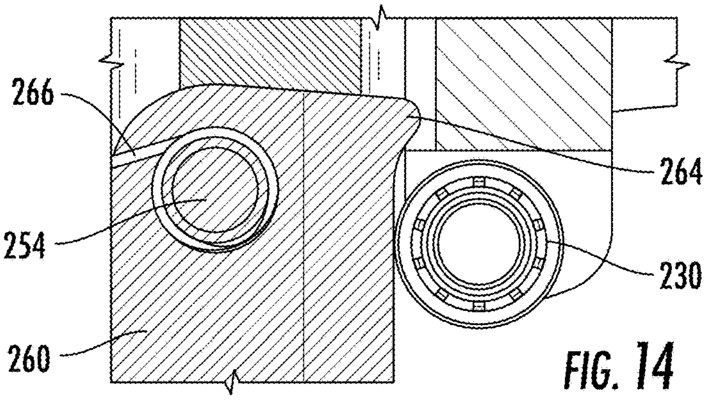
FIG. 14 is a greatly enlarged view of one of the claws and a portion of the yoke of the cap holding assembly of FIG. 9, with the claw shown in its engaged position.
Figure 17:
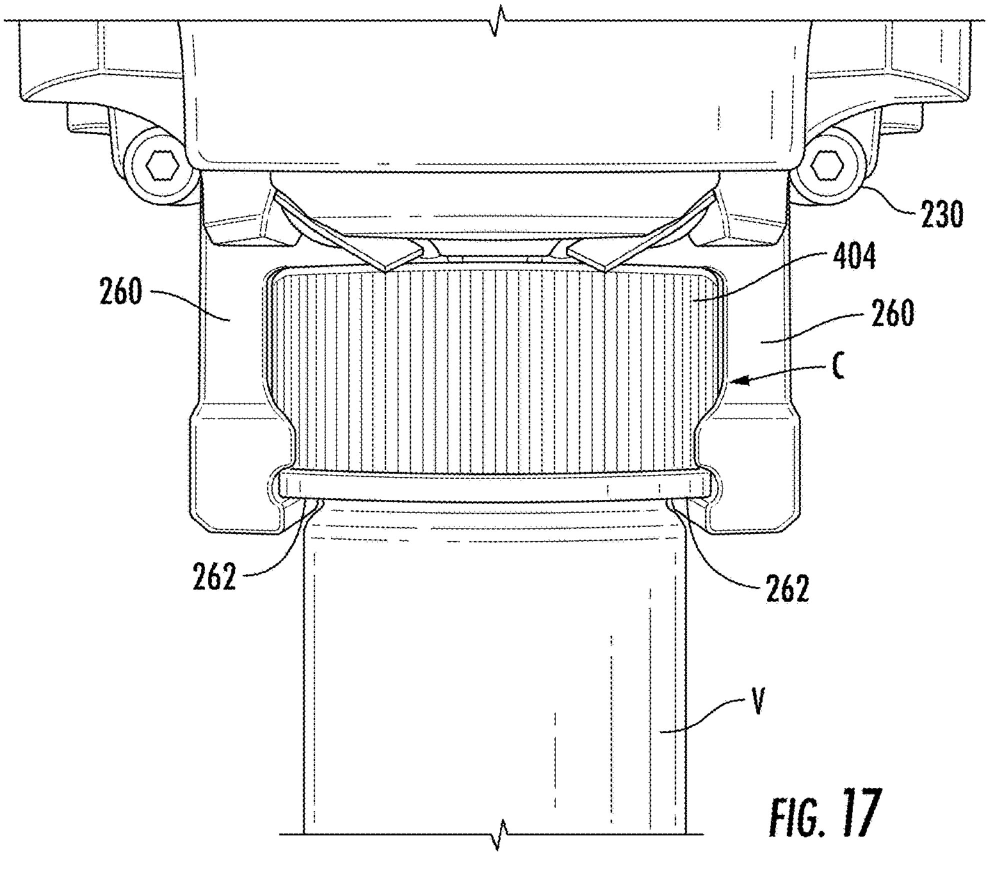
FIGS. 17-19 are enlarged front views illustrating the conversion of a cap on a filled vial from the child-resistant condition to the non-child-resistant condition.

Once the cap C has been rotated into place on the vial V, the actuator 208 extends the shaft 210, which in turn lowers the ram 214 and the core pins 216. In addition, lowering of the ram 214 lowers the yoke 220. As the yoke 220 is lowered, the bearings 230 of the arms 228 of the yoke 220 bear against the claws 260, thereby inducing each claw 260 to pivot about its pivot 254 so that the fingers 262 travel downwardly and radially inwardly. As the yoke 220 continues to descend, the claws 260 eventually reach a substantially vertical orientation (FIGS. 13 and 17). This orientation positions the fingers 262 beneath the lower edges of the outer portion 404 of the cap C. Also, at this lowered position of the yoke 220, the core pins 216 have lowered sufficiently that they extend just below the lower surface of the blade retainer 240.

Figure 18:
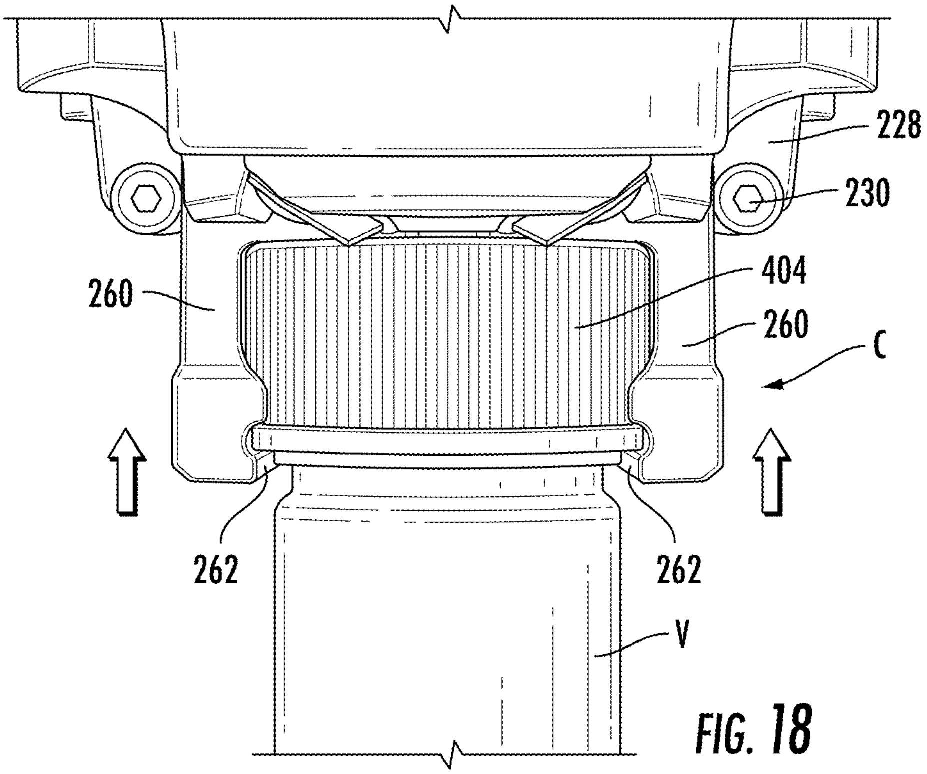
Figure 19:
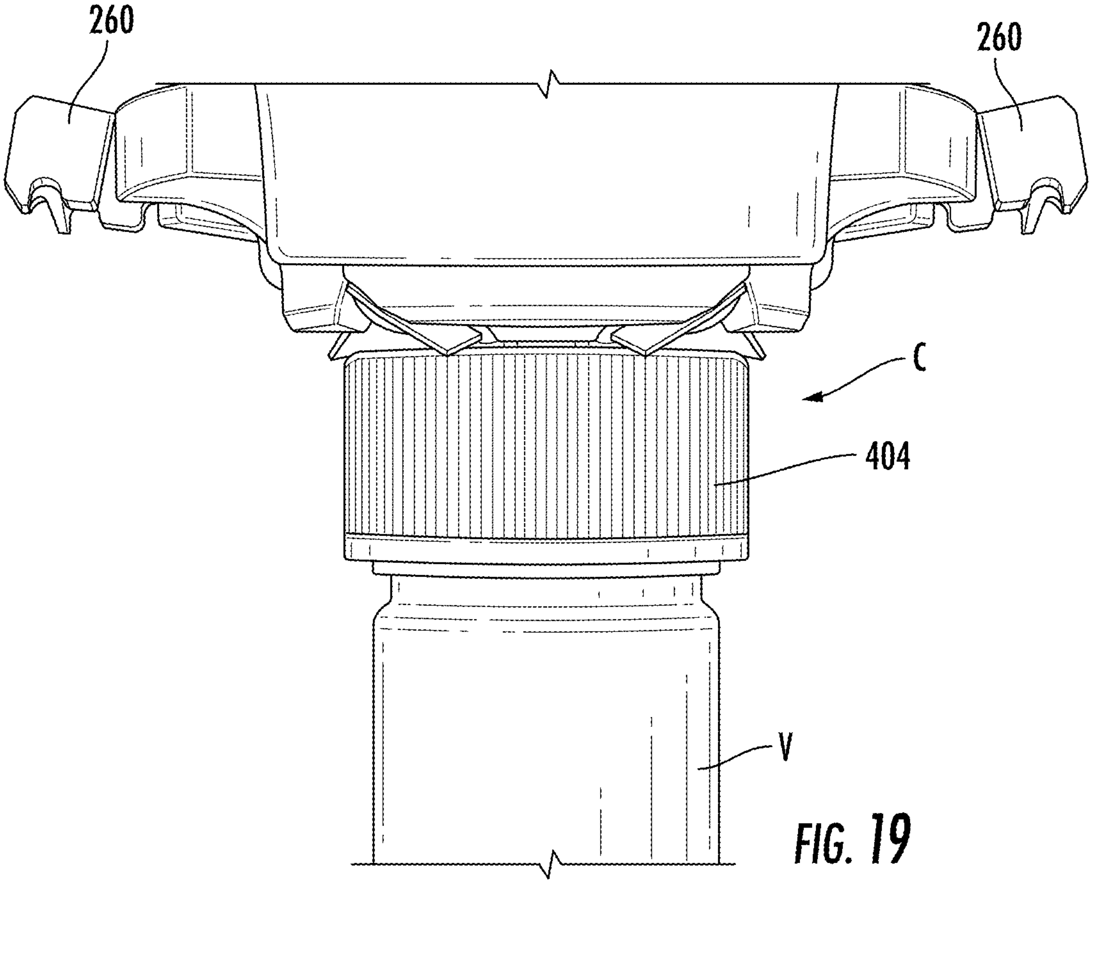

When the claws 260 have pivoted sufficiently that their fingers underlie the lower edge of the outer portion 404 of the cap C, the actuator 208 continues to drive the shaft 210 downwardly, which forces the core pins 216 lower. In addition, the elevator 110 raises from the main stage 138 slightly (see FIG. 18), which action raises the fingers 262 of the claws 260 against the lower edge of the cap C. This firmly forces the center portion 402 of the cap C against the core pins 216, which causes the center portion 402 to move downwardly relative to the outer portion 404, thereby converting the cap C to the non-child-proof configuration (FIG. 19).

At this point, the actuator 208 retracts the shaft 210, which retracts the pins 216 into the blade retainer 240. The retraction of the shaft 210 also draws the ram 214 and, in turn, the yoke 220 upwardly. As the yoke 220 rises, the arms 228 also rise. The biasing of the claws 260 by the springs 266 causes the claws 260 to return to their original extended position (i.e., as in FIGS. 11 and 12). This movement is augmented by the bearing 230 rising against the nub 264 of the claw, which action also encourages each claw 260 to rotate toward this extended position. Thus, the capped, filled vial V is free to be collected by the robotic arm and conveyed to the offload station.

Those of skill in this art will appreciate that the closure station 100 may take different forms. For example, other extendable members besides core pins may be employed. The stage may be configured to center the cap and vial differently, may be configured to grasp the container differently, and in some embodiments the cap and vial may be delivered for capping from different locations (i.e., not from the same main stage 138). The cap may be held by the cap holding assembly via a cap holding unit (e.g., small grippers) rather than a suction cap or bellows. Other variations may also be suitable.

Also, the closure station 100 may be employed in a different variety of automated pharmaceutical dispensing machine. For example, although the machine shown in FIGS. 5 and 6 is a standalone machine, a similar design may be employed as one of a fleet of machines used in a high-volume mail order pharmacy facility. In such an instance, the offload station 66 may be absent, with the carrier 68 instead delivering a filled, capped vial to a conveyor belt or to a tote containing multiple prescriptions. An example of such an arrangement in shown in U.S. Pat. Nos. 11,024,407 and 12,043,432, the disclosure of which is hereby incorporated herein by reference in full.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. An apparatus for securing a cap on a cylindrical container, the apparatus comprising:

a stage for separately receiving a cap and a container;

an elevator movable upwardly away from the stage and downwardly toward the stage;

a cap holding assembly mounted on the elevator and comprising:

a capture member platform, the capture member platform including a capture unit configured to capture the cap; and at least one extendable member extending through the capture member platform, the at least one extendable member movable from a home position with the extendable member above a center of the cap captured by the capture unit and an engagement position with the extendable member engaging the center of the cap and urging the center of the cap downwardly relative to an outer sidewall of the cap; and a claw member attached to the capture member platform that is movable between an unengaged position, in which the claw member is not positioned to engage the cap, and an engaged position, in which the claw member is positioned to engage a lower edge of the cap.

2. The apparatus of claim 1, wherein the claw member is pivotally attached to the capture member platform, such that the claw member pivots between the engaged and the unengaged positions.

3. The apparatus of claim 1, wherein the claw member is biased toward the unengaged position.

4. The apparatus of claim 1, wherein the cap holding assembly includes an actuator having an extendable shaft, and wherein the at least one extendable member is operatively connected with the shaft.

5. The apparatus of claim 4, wherein the cap holding assembly further comprises a yoke that is operatively connected with the shaft and that engages the claw member, and wherein the yoke forces the claw member to the engaged position when the shaft extends from the actuator.

6. The apparatus of claim 1, wherein the capture unit comprises a suction cup, and wherein the apparatus further comprises a suction source that selectively applies suction to the suction cup.

7. The apparatus of claim 6, wherein the at least one extendable member comprises a plurality of pins surrounding the suction cup.

8. The apparatus of claim 1, wherein the capture member platform includes a plurality of blades on a bottom surface thereof and surrounding the capture unit, wherein blade edges of the blades are positioned to engage the cap as it is being secured to the cylindrical container.

9. The apparatus of claim 1, further comprising a centering assembly comprising a plurality of clamps mounted to the stage that are configured to sequentially center the cap and the container on the stage.

10. The apparatus of claim 1, mounted within an automated pharmaceutical dispensing machine.

* * * * *